US011467042B2

(12) United States Patent
Johnston et al.

(10) Patent No.: US 11,467,042 B2
(45) Date of Patent: Oct. 11, 2022

(54) DEVICE, SYSTEM AND METHOD FOR TEMPERATURE LIMIT INDICATION AND DETECTION OF TEMPERATURE-SENSITIVE ITEMS

(71) Applicant: BLUECHIIP LIMITED, Caribbean Park Scoresby (AU)

(72) Inventors: Ian Johnston, Northampton (GB); Andrew McLellan, Ashburton (AU); Scott Turner, Mornington (AU); Efstratios Stan Skafidas, Thornbury (AU); Phuong Duc Nguyen, Albion (AU); Duc Hau Huynh, Lalor (AU); Thanh Cong Nguyen, Sunshine West (AU)

(73) Assignee: BLUECHIP LIMITED, Caribbean Park Scoresby (AU)

(*) Notice: Subject to any disclaimer, the term of this patent is extended or adjusted under 35 U.S.C. 154(b) by 883 days.

(21) Appl. No.: 16/328,807

(22) PCT Filed: Aug. 31, 2017

(86) PCT No.: PCT/AU2017/050933
§ 371 (c)(1),
(2) Date: Feb. 27, 2019

(87) PCT Pub. No.: WO2018/039727
PCT Pub. Date: Mar. 8, 2018

(65) Prior Publication Data
US 2019/0212210 A1     Jul. 11, 2019

(30) Foreign Application Priority Data

Aug. 31, 2016  (AU) .................. 2016903474

(51) Int. Cl.
*G01K 11/06* (2006.01)
*B65D 79/02* (2006.01)

(52) U.S. Cl.
CPC .............. *G01K 11/06* (2013.01); *B65D 79/02* (2013.01)

(58) Field of Classification Search
CPC .............................. G01K 11/06; B65D 79/02
See application file for complete search history.

(56) References Cited

U.S. PATENT DOCUMENTS 3,695,903 A   10/1972  Telkes
5,531,180 A   7/1996   Bianchini
(Continued)

FOREIGN PATENT DOCUMENTS

CN   102853946 A   1/2013
CN   105136330 A   12/2015
(Continued)

OTHER PUBLICATIONS

CNIPA Second Office Action dated Feb. 1, 2021 issued in respect of Chinese Patent Application No. 201780066433.9.
(Continued)

*Primary Examiner* — Nimeshkumar D Patel
*Assistant Examiner* — Tania Courson
(74) *Attorney, Agent, or Firm* — Cantor Colburn LLP

(57) ABSTRACT

A device for indicating violation of a temperature limit of an item is provided. The device is positionable near the item and includes a sensor configured to change its state permanently when the temperature limit is violated. The change in sensor state is machine-readable to provide a permanent indication of the temperature limit violation. The sensor includes a reservoir for storing a fluid that changes phase from a solid to a liquid when the temperature limit is violated and a channel in fluid communication with the (Continued)

reservoir for receiving flow of the fluid in liquid phase from the reservoir. The sensor is arranged to allow flow of the fluid in the liquid phase such that the state of the sensor is permanently changed. The sensor is further configured to prevent the fluid flow from permanently changing the sensor state until activation of the sensor from a resting state. A system and method for detecting violation of a temperature limit of an item using the device is also provided.

17 Claims, 7 Drawing Sheets

(56) References Cited

U.S. PATENT DOCUMENTS

| | | | | |
|---|---|---|---|---|
| 6,848,390 | B2* | 2/2005 | Akers | G01K 5/483 |
| | | | | 374/E3.004 |
| 6,916,116 | B2* | 7/2005 | Diekmann | G01K 3/04 |
| | | | | 374/102 |
| 7,275,863 | B1 | 10/2007 | Akers | |
| 7,607,829 | B2* | 10/2009 | Sumida | G01K 11/08 |
| | | | | 374/106 |
| 7,667,594 | B2* | 2/2010 | Funo | G01K 11/06 |
| | | | | 340/562 |
| 7,940,605 | B2* | 5/2011 | Ambrozy | G04F 1/06 |
| | | | | 368/327 |
| 8,033,237 | B2* | 10/2011 | Havens | G01K 5/483 |
| | | | | 116/200 |
| 8,043,000 | B2* | 10/2011 | Sumida | G01K 7/32 |
| | | | | 374/102 |
| 9,581,501 | B2* | 2/2017 | Kozono | G01K 1/02 |
| 9,689,749 | B2* | 6/2017 | Røhr | G01K 3/04 |
| 10,908,031 | B1* | 2/2021 | White | G01K 11/06 |
| 2003/0188677 | A1 | 10/2003 | Akers | |
| 2007/0275467 | A1 | 11/2007 | Louvet | |
| 2008/0259992 | A1 | 10/2008 | Sumida | |
| 2010/0322037 | A1* | 12/2010 | Robinson | G04F 1/00 |
| | | | | 368/89 |
| 2016/0161919 | A1* | 6/2016 | Patel | G04F 1/02 |
| | | | | 73/1.42 |

FOREIGN PATENT DOCUMENTS

| | | |
|---|---|---|
| CN | 105758551 A | 7/2016 |
| EP | 0545274 A1 | 6/1993 |
| JP | 59164929 A | 9/1984 |
| WO | 2004084131 A1 | 9/2004 |
| WO | 2010037166 A1 | 4/2010 |

OTHER PUBLICATIONS

Communication pursuant to Article 94(3) EPC dated Feb. 22, 2021 issued in respect of European Patent Application No. 17844689.4.
Australian Search Report for corresponding application 2016903474 filed Aug. 31, 2016; dated Aug. 3, 2017.
Bhattacharyya, Rahul, Christian Floerkemeier, and Sanjay Sarma. "RFID Tag Antenna Based Temperature Sensing." RFID, 2010 IEEE International Conference on. IEEE, 2010.
Bhattacharyya, Rahul, et al. "RFID Tag Antenna Based Temperature Sensing Using Shape Memory Polymer Actuation." Sensors, 2010 IEEE. IEEE, 2010.
Chinese Office Action for corresponding application 201780066433.9; dated Jul. 1, 2020.
European Search Report for corresponding application 17 844 689.4; dated Apr. 2, 2020.
International Preliminary Report on Patentability for corresponding application PCT/AU2017/050933 filed Aug. 31, 2017; dated Mar. 5, 2019.
Ong et al, "Design and application of a wireless, passive, resonant-circuit environmental monitoring sensor", Sensors and Actuators, 2001.
International Search Report for corresponding application PCT/AU2017/050933 filed Aug. 31, 2017; dated Nov. 13, 2017.
Chinese Office Action for corresponding application 201780066433.9; dated Jul. 28, 2021.
Japanese Office Action for corresponding application 2019-510703: dated May 27, 2021.
Australian Examination Report for corresponding application 2017320346; dated Sep. 14, 2021.

* cited by examiner

DEVICE, SYSTEM AND METHOD FOR TEMPERATURE LIMIT INDICATION AND DETECTION OF TEMPERATURE-SENSITIVE ITEMS

This application claims priority from Australian Provisional Patent Application No. 2016903474 filed on 31 Aug. 2016, the contents of which are to be taken as incorporated herein by this reference.

TECHNICAL FIELD

This invention relates to a device for indicating violation of a temperature limit of an item and a system and method for detecting the temperature limit violation. It relates particularly but not exclusively to a device that enables permanent machine-readable indication of temperature limit violations that occur during storage, processing and transportation of temperature-sensitive items.

BACKGROUND OF INVENTION

Certain biological samples are required to be maintained at very low temperatures for long-term storage, such as red blood cells, plasma, bacterial or viral strains, embryos, gametes and extracted DNA to name a few. These samples are typically required to be maintained at temperatures of less than −60° C. to −200° C. To achieve this, the samples are usually placed in vials, bags, cassettes or other similar vessels and stored within mechanical freezers or in dry ice at temperatures of −60° C. to −150° C., or within cryogenic tanks containing liquid nitrogen at temperatures of less than −150° C. Storage at these temperatures ensures sample integrity, thereby maximising the likelihood of cell viability when thawed.

Different biological samples have different critical temperatures, that is, a temperature above which changes may occur at the cellular structure level and hence above which the biological sample may degrade. The sample does not necessarily thaw to be above its critical temperature, usually considered to be the glass transition temperature of water, and may suffer cellular damage whilst remaining in the frozen state. It is generally accepted that the sample must be held below its critical temperature at all times from when it is first frozen to intentionally thawed in a controlled manner for final processing.

Likewise the same principle applies to other temperature-sensitive products such as fresh produce, food products, perishables, pharmaceuticals, drugs, and chemical compounds to name a few. For example, a typical standard for frozen food products is that they must be stored and handled at temperatures less than −18° C. That is, each type of item will be subject to a different critical temperature value or range to ensure it remains viable. After being frozen and stabilised at a safe temperature, further storage, processing or transport must ensure that the item is held below its critical temperature. The failure to do so may render the items unviable, resulting in loss of items having significant monetary value and/or importance, such as drugs for medical treatment.

Each of the industries consuming or processing the aforementioned items rely on different storage, processing and transportation systems to maintain temperature and tracking of the items. At various stages in the supply chain, it is important to determine that the item is still presently viable, and has also not experienced an event causing its critical temperature value or range to be exceeded. The item's critical temperature value or range will be referred to herein as the item's "temperature limit". Further, the event causing the item's temperature limit to be exceeded or violated will be referred to herein as a "temperature limit violation". It is known to employ temperature loggers and indicators for use in determining whether violation of an item's temperature limit has occurred.

Temperature loggers are small electronic devices which incorporate a sensing element, such as a thermistor or thermocouple, with electronic circuits and a memory to record temperature readings over time. Typically, these devices are interrogated wirelessly to download the thermal history, which is then separately processed to flag any temperature limit violations. However, temperature loggers do not provide a permanent record of temperature limit violations, thereby risking tampering or loss of the recorded data and introduction of inaccuracies during processing.

Moreover, temperature loggers must be removed from the item or storage environment for interrogation of the recorded data. This process may risk exposure of the item to ambient temperatures that may render it unviable. Temperature loggers may also not be in close contact with the item due to size limitations. Accordingly, a short temperature excursion may result in a false negative indication as the item itself has not experienced a critical rise in temperature. Such inaccuracy may cause items to be erroneously identified as unviable. Temperature loggers are also limited to use in storage temperatures above −40° C. and thus cannot be used for ultra-cold (less than −60° C.) or cryogenic conditions.

Temperature indicator strips are used in cold chain logistics for identifying temperature limit violations of items requiring storage at temperatures of 0° C. to −60° C., such as food products and pharmaceuticals. The indicator strips are typically stickers that are either adhered to an item or a container storing an item and utilise a chemical reaction to change colour in a predetermined temperature range. Similarly, temperature indicator vials are used in cryogenic storage of various items and include a heat-sensitive material that changes colour in a predetermined temperature range. The indicator strips or vials are selected for use with an item based on their temperature range corresponding to the item's critical temperature value or range.

In contrast to temperature loggers, temperature indicator strips or vials provide a permanent visual indication of temperature limit violations. However, this requires human operators to observe and react to the indicator colour change, thus leading to potential human error. For example, it may be difficult to observe the indicator in frosted conditions in which the item is stored. In some cases, the item may also require removal from storage in order to observe the indicator, which may expose the item to ambient temperatures rendering it unviable. Furthermore, the indicator strips or vials may not be in close contact with the item due to size limitations, which may cause false negative indications as described above.

It would therefore be desirable to provide a device that enables permanent machine-readable indication of violation of an item's temperature limit, and/or which ameliorates and/or overcomes one or more problems and/or inconveniences of the prior art.

A reference herein to a patent document or any other matter identified as prior art, is not to be taken as an admission that the document or other matter was known or that the information it contains was part of the common general knowledge as at the priority date of any of the claims.

SUMMARY OF INVENTION

In one aspect, the present invention provides a device for indicating violation of a temperature limit of an item, wherein the device is positionable near the item and includes a sensor configured to change its state permanently when the temperature limit is violated, wherein the change in sensor state is machine-readable to provide a permanent indication of the temperature limit violation, the sensor including: a reservoir for storing a fluid that changes phase from a solid to a liquid when the temperature limit is violated; and a channel in fluid communication with the reservoir for receiving flow of the fluid in liquid phase from the reservoir, wherein the sensor is arranged to allow flow of the fluid in the liquid phase such that the state of the sensor is permanently changed, and wherein the sensor is further configured to prevent the fluid flow from permanently changing the sensor state until activation of the sensor from a resting state.

Advantageously, the device ensures that a permanent record of the temperature limit violation is made due to the permanent change in sensor state, which is machine-readable for processing at a later time. For example, the change in sensor state may be machine-read at any time during the supply chain, such as during storage, processing and/or transportation of the item. Accordingly, the device more accurately and reliably indicates temperature limit violations than the prior art devices since it is not reliant on human operators to observe visual indicators or process data records to identify temperature limit violations.

In some embodiments, the sensor includes a barrier for preventing the fluid flow from permanently changing the sensor state, the barrier being removable to activate the sensor from the resting state. The sensor may be activated from the resting state to an activated state. The barrier may include one of a seal, a membrane or a valve. The barrier may be positioned between the reservoir and the channel to prevent the fluid stored in the reservoir from flowing into the channel. Additionally/alternatively, the barrier may be positioned within the channel or at an end of the channel other than the reservoir end.

In order to enable fluid flow, the sensor may include a ventilation path for equalising the pressure within the sensor to allow fluid flow therethrough. The ventilation path may be in fluid communication with at least the reservoir. The barrier may be positioned at least one of: between the reservoir and the ventilation path; at an end of the ventilation path other than the reservoir end; or within the ventilation path.

The barrier may be automatically removable to activate the sensor by at least one of: the barrier including a temperature-dependent material that degrades or shrinks at a desired temperature; and the sensor further including a gas-filled capsule that contracts to remove a force on the barrier at a desired temperature.

The barrier may also be manually removable to activate the sensor by at least one of: the barrier including a magnetic material to which a magnetic field can be applied and/or removed to alter a magnetic force on the barrier; and the barrier being coupled to an external actuator that is operable to apply and/or remove a force on the barrier. For example, the barrier may be constructed of a small ball bearing that when placed in a sufficient magnetic field causes the ball to be trapped between e.g. the reservoir and the channel.

The sensor may change its state from an activated state to a triggered state when the temperature limit is violated. The change in sensor state is permanent and the sensor is unable to revert to the activated state.

The channel of the sensor may be sized and shaped such that capillary forces drive the fluid flow from the reservoir into the channel. For example, the sensor may be microfluidic-based and the channel may be a microfluidic channel dimensioned such that capillary forces drive the fluid flow. The channel may also include a hydrophilic surface to encourage fluid flow from the reservoir into the channel. This may be achieved through oxygen plasma etching of the channel. Furthermore, the reservoir may include a hydrophobic surface to encourage fluid flow from the reservoir into the channel. For example, the reservoir may include a hydrophobic coating.

The sensor may be constructed of a supporting layer and additional layers bonded onto the supporting layer that enclose at least the reservoir and the channel. Preferably, a capacitor, inductor and electric circuit of the sensor are also enclosed by the additional layers bonded onto the supporting layer. The device may also include a thermally conductive enclosure housing the sensor for providing close thermal contact with the item. This beneficially reduces the likelihood of false negative indications since the temperature in the sensor will correspond closely with the actual temperature of the item.

The fluid stored in the sensor may be a single fluid or combination of fluids selected to have a desired melting point corresponding to the temperature limit of the item. Preferably the fluid is an aqueous solution. For example, the fluid may be a 70% ethanol solution with a melting point of about −50° C. In some embodiments, the device includes two or more sensors and each sensor stores a different fluid for indicating violation of more than one temperature limit of the item. The temperature limit of the item may be a single temperature or range of temperatures.

The sensor is arranged to allow flow of the fluid in the liquid phase such that the state of the sensor is permanently changed. That is, the sensor state is not resettable if the item's temperature no longer exceeds the temperature limit, i.e. the critical temperature value or range for the item. The fluid flow may cause a permanent change in a property of the sensor. The property may include an electrical property selected from one of a group including: impedance, resistance, capacitance and inductance.

In some embodiments, the sensor includes a capacitor and the fluid flow causes a permanent change in capacitance. The fluid flow may be either driven towards or away from conductors of the capacitor to cause the permanent change in capacitance. The capacitor may be positioned in fluid communication with the channel such that the fluid flow is driven towards the conductors of the capacitor. For example, the capacitor may be positioned within the channel or at an end of the channel other than the reservoir end, such as opposite the reservoir. Alternatively, the capacitor may be positioned within the reservoir such that the fluid flow is driven away from the conductors of the capacitor. In each of the various configurations, the conductors of the capacitor are permanently changed as a result of the fluid flow thereacross.

The sensor may also include an electrical circuit connected to the capacitor that is configured to provide a machine-readable indicator of the change in sensor state. For example, the electrical circuit may include an inductor and the machine-readable indicator may be a variation in resonant frequency of the electrical circuit. The machine-readable indicator may be detected by interrogating the electrical circuit through direct contact or wireless interrogation. The variation in resonant frequency may be analysed to not only provide an indication that a temperature limit violation has occurred, but also to indicate the amount of fluid in the sensor that converted to liquid phase and the amount of time that the temperature limit of the item was violated. This may be beneficial where a short temperature excursion has occurred such that only a small amount of the fluid has thawed prior to refreezing. Accordingly, the viability of the item may be assessed depending on the extent of the temperature limit violation.

The sensor may be further configured to provide a machine-readable identifier of the item, such as to provide unique item identification. Advantageously, the electrical circuit may be configured to provide the machine-readable identifier along with the machine-readable indicator, which may both be readable in a single interrogation of the electrical circuit, such as by using an interrogator. For example, the sensor may include a plurality of resonant members encoding an identification code and the resonant members may have different resonant frequencies from each other. Preferably, the resonant members are vibratable by a Lorentz-type force on application of an excitation signal by an interrogator to the electrical circuit to read the identification code.

The sensor may be further configured to provide a permanent visual indicator of the change in sensor state. This advantageously allows immediate detection by an operator of a temperature limit violation. An indicator chamber may be provided in fluid communication with the channel and may include an absorbent material impregnated with a colour dye. The dye may change colour when the absorbent material is wetted by the fluid flow. The indicator chamber may be positioned at an end of the channel other than the reservoir end, such as opposite the reservoir, to prevent the absorbed fluid from returning to the reservoir and ensure that the state of the sensor is permanently changed.

The ventilation path may be a return path between the reservoir and the indicator chamber. In some embodiments, a capacitor may be positioned within the indicator chamber or the ventilation path. Alternatively, the ventilation path may be achieved by venting both of the reservoir and channel to the surrounding environment, e.g. atmosphere.

The item may be temperature-sensitive and selected from one of a group including: biological samples; fresh produce, food products, perishables, pharmaceuticals and chemical compounds. Each of these items may require storage at temperatures of $-200°$ C. to $0°$ C. Accordingly, the temperature limit may be either a temperature value or temperature range that is within a range of from $-200°$ C. to $0°$ C.

In another aspect, the present invention provides a system for detecting violation of a temperature limit of an item, the system including: a device for indicating violation of a temperature limit of an item as described above positioned near the item; and an interrogator configured to: identify the change in sensor state when the temperature limit is violated; and detect violation of the temperature limit based on the identified change in sensor state.

The system may include one or more temperature sensors positionable in thermal proximity to the item. The temperature sensors may be selected from one or both of: optical temperature sensors including laser and/or infra-red, or wire temperature sensors including thermocouple, thermistor and/or resistance temperature detectors (RTD).

In some embodiments, the interrogator further includes an alert component which emits an alert if a temperature limit violation is detected. The alert may be one of an auditory, visual or sensory alert. The interrogator may further include a communications module for transmitting one or more of: detected temperature limit violations, identification of the item and temperature of the item to a remote computing system to provide a data log accessible over a communications network.

In some embodiments, the interrogator is configured to detect a machine-readable indicator of the change in sensor state. For example, the machine-readable indicator may be a permanent change in capacitance of the sensor as described above. The interrogator may include an interrogator coil configured to interrogate an electrical circuit of the sensor. Further, the interrogator coil may be positioned such that it is in proximity to the electrical circuit of the sensor in use. The machine-readable indicator may be a variation in resonant frequency of the electrical circuit detected by the interrogator. The variation in resonant frequency may be detected through direct contact with the electrical circuit or through wireless, passive interrogation using the interrogator.

The interrogator may include an integrated signal processing circuitry to generate an interrogation signal in the interrogator coil such that when the interrogator coil is in proximity with an inductor coil of the sensor, an excitation signal is induced in the inductor coil from the interrogation signal in the interrogator coil.

In some embodiments, the interrogator is further configured to detect a machine-readable identifier of the item. The machine-readable identifier may include an identification code unique to the item. The sensor may include at least one resonant member and the machine-readable identifier may be a variation in resonant frequency of the at least one resonant member. A common electrical conductor may run along the at least one resonant member. Further, the electrical conductor may be section of the electrical circuit of the sensor. Accordingly, the machine-readable identifier and machine-readable indicator may be detected in a single interrogation of the electrical circuit by the interrogator.

The temperature limit may be either a temperature value or temperature range within a range of from $-200°$ C. to $0°$ C. Further more, the item may be temperature-sensitive and selected from one of a group including: biological samples; fresh produce, food products, perishables, pharmaceuticals and chemical compounds.

In another aspect, the present invention provides a method for detecting violation of a temperature limit of an item, the method including the steps of: positioning a device for indicating violation of a temperature limit of an item as described above near the item; identifying the change in sensor state when the temperature limit is violated; and detecting violation of the temperature limit based on the identified change in sensor state.

In some embodiments, the method further includes, before positioning the device near the item, the step of activating the sensor from a resting state to allow flow of the fluid in the liquid phase such that the state of the sensor is permanently changed. In some embodiments, activating the sensor includes the step of removing a barrier preventing the fluid flow from permanently changing the sensor state. The barrier may include one of a seal, a membrane or a valve. The barrier may be removed from one or more of: between the reservoir and the channel; within the channel or at an end of the channel other than the reservoir end; between the reservoir and a ventilation path in fluid communication with at least the reservoir; and within the ventilation path or at an end of the ventilation path other than the reservoir end.

The step of removing the barrier includes automatically changing the ambient temperature to a desired temperature such that at least one of: a temperature-dependent material of the barrier degrades or shrinks; and a gas-filled capsule of the sensor contracts to remove a force on the barrier. The step of removing the barrier may also include manually removing the barrier by at least one of: applying and/or removing the presence of a magnetic field influencing a magnetic material of the barrier to alter a magnetic force on the barrier; and applying and/or removing a force applied to the barrier by operating an external actuator coupled to the barrier.

In some embodiments, the method further includes, before activating the sensor, the step of reducing the ambient temperature such that the fluid stored in the reservoir changes phase from a liquid to a solid. After this step, the sensor is in a resting state prior to being activated as described above.

Identifying the change in sensor state may include the step of detecting a machine-readable indicator of the change in sensor state. Detecting the machine-readable indicator may include the steps of interrogating an electrical circuit of the sensor and detecting a variation in resonant frequency of the electrical circuit. The variation in resonant frequency may be measured through direct contact with the electrical circuit or through wireless, passive interrogation using an interrogator.

The method may further include the step of detecting a machine-readable identifier of the item. Detecting the machine-readable identifier may include the steps of interrogating the electrical circuit of the sensor and detecting a variation in resonant frequency of the electrical circuit. Advantageously, the machine-readable indicator and machine-readable identifier may be detected in a single interrogation of the electrical circuit using an interrogator.

In some embodiments, identifying the change in sensor state includes the step of observing a permanent visual indicator of the change in sensor state. Observing the permanent visual indicator may include the steps of viewing an indicator chamber of the sensor having a colour dye and checking for a colour change in the dye of the indicator chamber.

The temperature limit may be either a temperature value or temperature range within a range of from −200° C. to 0° C. Further more, the item may be temperature-sensitive and selected from one of a group including: biological samples; fresh produce, food products, perishables, pharmaceuticals and chemical compounds.

BRIEF DESCRIPTION OF DRAWINGS

The invention will now be described in greater detail with reference to the accompanying drawings in which like features are represented by like numerals. It is to be understood that the embodiments shown are examples only and are not to be taken as limiting the scope of the invention as defined in the claims appended hereto.

DETAILED DESCRIPTION

Embodiments of the invention are discussed herein by reference to the drawings which are not to scale and are intended merely to assist with explanation of the invention. The inventive device, system and method have utility in enabling permanent machine-readable indication and detection of temperature limit violations that occur during storage, processing and transportation of temperature-sensitive items. The inventive device, system and method may be used in conjunction with various items including biological samples, such as red blood cells, plasma, bacterial or viral strains, gametes and embryos, produce, such as fresh produce, food products, perishables, pharmaceuticals, drugs and chemical compounds, and other temperature sensitive items that require cold, ultra-cold (i.e. less than −60° C.) or cryogenic storage.

Figure 1:
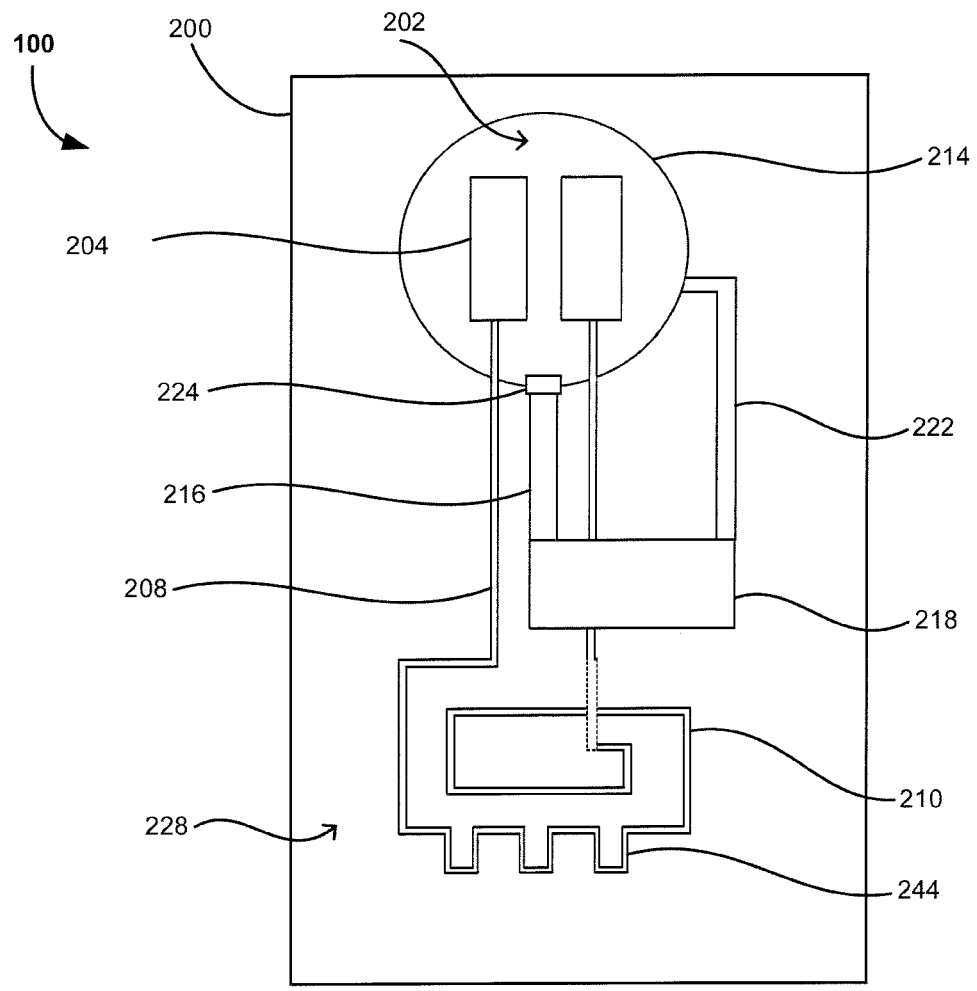
FIG. 1 is a plan view of a device for indicating violation of a temperature limit of an item according to an embodiment of the invention.

FIG. 1 illustrates a device 100 for indicating violation of a temperature limit of an item according to a preferred embodiment of the invention. The device 100 is positionable near the item and includes a sensor 200 configured to change its state permanently when the temperature limit is violated. The change in sensor state is machine-readable to provide a permanent indication of the temperature limit violation. The sensor 200 includes a reservoir 214 for storing a fluid 202 that changes phase from a solid to a liquid when the temperature limit is violated. The sensor 200 also includes a channel 216 in fluid communication with the reservoir 214 for receiving flow of the fluid 202 in liquid phase from the reservoir 214. The sensor 200 is arranged to allow flow of the fluid 202 in the liquid phase such that the state of the sensor 200 is permanently changed. The sensor 200 is further configured to prevent the fluid flow from permanently changing the sensor state until activation of the sensor 200 from a resting state.

The device 100 is able to be positioned near the item for providing close thermal contact (not shown). In some embodiments, the device 100 may be sized and/or shaped for positioning directly at or substantially near the item. The device 100 may be compact for placement within the item or directly attached to the item or a container storing the item. For example, the device 100 may be sized such that it can be placed within a biological sample or incorporated into a storage container, such as a vial, bag or similar vessel, without causing an appreciable increase in weight or size. Moreover, the device 100 may include a thermally conductive enclosure housing the sensor 200 for providing close thermal contact with the item (not shown). The enclosure may include a material having thermally conductive properties selected to be suitable for the particular item and the temperature-controlled storage environment.

Close thermal contact beneficially ensures that the device 100 relies on the temperature indicated directly at or substantially near the item for accurately indicating temperature limit violations. If the device 100 is not in close thermal contact, a short temperature excursion may result in a false negative indication since the item has not itself experienced a critical rise or drop in temperature. Accordingly, close thermal contact will reduce the likelihood of false negative indications due to the device 100 relying on temperatures that correspond exactly or substantially closely to the actual temperature of the item.

As shown in FIG. 1, the sensor 200 includes a supporting layer or substrate 228. The supporting layer 228 may be constructed of glass, acrylic, silicon wafer or other flexible polymers, such as polyethylene terephthalate (PET). Preferably the supporting layer 228 is sufficiently thick in order to support additional layers bonded thereon. For example, in an alternative embodiment of the device 100 shown in FIG. 2, an upper layer 230 is bonded to the supporting layer or substrate 228 and encloses the sensor components. The supporting layer 228 may also be treated to be hydrophilic, such as through oxygen plasma etching of the surface. A hydrophilic surface is particularly advantageous for encouraging fluid flow across the supporting layer 228, which is discussed in more detail below.

The sensor 200 includes a reservoir or fluidic well 214 for storing a fluid 202. The fluid 202 may be a single fluid in the form of a solution or a combination of fluids in the form of a mixture. The single fluid or combination of fluids 202 are selected to have a desired melting point corresponding to the temperature limit of the item. Preferably, the fluid 202 is an aqueous solution so that properties of the fluid 202 can be varied by dilution, such as the fluid's melting point and freezing point. For example, 70% ethanol solution has a melting point at around −50° C., while 100% ethanol has a melting point at around −114° C., so the temperature can be varied by dilution in water. Other suitable fluids 202 may include other alcohols such as 1-propanol which has a melting point of −127° C.

Before the device 100 is positioned near the item, the fluid 202 is initially stored in the reservoir 214 in a liquid state. As shown in FIG. 1, the reservoir 214 is in communication with a channel 216. In order to prevent inadvertent flow of the fluid 202 into the channel 216, the sensor 200 includes a barrier 224 positioned between the reservoir 214 and the channel 216. The barrier 224 may prevent fluid flow from the reservoir 214 from permanently changing the sensor state, the barrier 224 being removable to activate the sensor 200. The barrier 224 is illustrated in FIG. 1 as a seal, membrane or valve 224 that is positioned between the reservoir 214 and channel 216. In other embodiments, the barrier 224 may also be provided within the channel 216 or at the end of the channel 216 other than the reservoir end, such as opposite the reservoir 214 that is coupled to the indicator chamber 218. The barrier 224 ensures that fluid leakage to other components of the sensor 200 is not permitted until the sensor 200 adopts an activated state.

Figure 2:
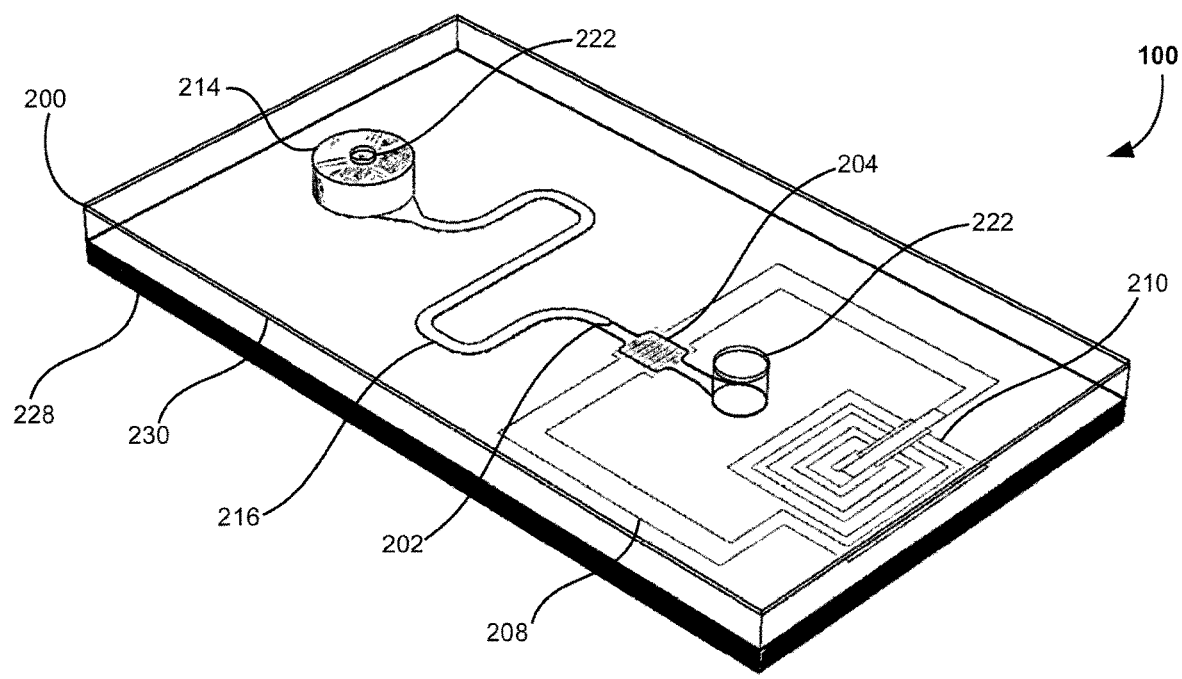
FIG. 2 is a perspective view of a device for indicating violation of a temperature limit of an item according to another embodiment of the invention.

In other embodiments (not shown), the barrier 224 may be provided in a ventilation path 222 of the sensor 200, as shown in FIGS. 1 and 2 and described in more detail below. The barrier 224 may be positioned between the reservoir or storage chamber 214 and the ventilation path 222, at an end of the ventilation path 222 other than the reservoir end or within the ventilation path 222. The barriers in these embodiments prevent flow of the fluid 202 due to back pressure.

Once the fluid 202 is trapped in the reservoir 214, the sensor 200 is then placed in a temperature-controlled environment such that the fluid 202 changes phase from a liquid to a solid. For example, the sensor 200 may be placed in a low-temperature environment, such as in a mechanical freezer, so that the fluid 202 freezes at a temperature below its freezing point. Once the liquid freezes and converts to a solid, the sensor 200 adopts a resting state.

In order to activate the sensor 200 from the resting state, the barrier 224 must be removed (not shown) so that sensor 200 adopts an activated or armed state. The activation or arming of the sensor 200 may occur through automatic or manual removal of the barrier 224. The barrier 224 may be a membrane, seal or valve that blocks a fluid path from the reservoir 214 to the channel 216 and/or ventilation path 222, and may block an opening of the reservoir 214 in fluid communication with the channel 216 and/or ventilation path 222. The sensor 200 includes at least one barrier 224 although in some embodiments the sensor 200 may include two or more barriers 224.

The arming of the sensor 200 may occur through manual removal of the barrier 224, such as by applying or removing an external force on the barrier 224. In some embodiments, the barrier or membrane 224 may include a magnetic material that traps the fluid 202 in the reservoir 214 in the presence of a magnetic field. For example, the barrier or membrane 224 may be constructed of a small ball bearing which becomes trapped in a space between the reservoir 214 and the channel 216. The barrier or membrane 224 may be removed by moving the device 100 out of the magnetic field or by turning the magnetic field off. Alternatively, the barrier or membrane 224 may be mechanically connected to an external actuator, which applies pressure to the membrane 224 to trap the fluid 202 in the reservoir 214. The barrier or membrane 224 may be removed through operation of the external actuator.

In other embodiments, the arming of the sensor 200 may occur through automatic removal of the barrier 224. The barrier or membrane 224 may include a temperature-dependent material such as a temperature-dependent shape memory material. When the surrounding temperature reaches a desired temperature, the material may degrade or break open to activate the sensor 200 due to forces exerted by the material at the desired temperature. Alternatively, the barrier or membrane 224 may include a temperature-dependent material that shrinks to activate the sensor 200. The material may include a larger thermal expansion coefficient so that when the surrounding temperature reaches a desired temperature, material shrinkage unblocks the fluid path from the reservoir 214 to the channel 216.

In another embodiment, the sensor 200 may include a gas-filled capsule, which relies on expansion/contraction of gas (reducing pressure in a sealed capsule), to exert a force. The capsule may be constructed by sealing a mixture of two chemicals (e.g. calcium carbonate and acetic acid) which will produce $CO_2$ gas amongst other components which expand in the capsule. The expanded capsule applies force to the barrier or membrane 224 to trap the fluid 202 in the reservoir 214. When the surround temperature reaches a desired temperature, the capsule will shrink which interacts with the barrier or membrane 224 at either end of the channel 16 to remove and activate the sensor 200. The capsule can be designed to a trigger the sensor 200 at a specific temperature value or range by varying the mixture and geometry.

In other embodiments, the sensor 200 may include a valve-actuated means 224 at one or both ends of the channel 216. The valve-actuated means 224 may be a valve that is operable under temperature-dependent conditions. For example, when the surrounding temperature reaches a desired temperature the valve 224 may open, thereby allowing fluid flow into the channel 216. Alternatively, the valve 224 may be operable through an external actuator such as a pneumatic pump.

Once the sensor 200 has adopted the activated state, the device 100 may be positioned near the item for use in indicating temperature limit violations. Notably, the fluid 202 is selected to have a desired melting point that corresponds exactly with or substantially close to the item's temperature limit, i.e. the critical temperature value or range required to ensure viability. Accordingly, when the item's temperature limit is violated, i.e. the item's temperature exceeds the threshold temperature value or range, the temperature of the fluid 202 exceeds its melting point causing it to melt and change phase from a solid to a liquid. Since the barrier 224 has been removed, the fluid 202 is able to flow in its liquid state from the reservoir 214 and into the channel 216.

In order to encourage fluid flow, the channel 216 may be sized and shaped such that capillary forces drive the fluid flow from the reservoir 214 and into the channel 216. In some embodiments, the sensor 200 may be a microfluidic sensor and the channel 216 may be a microfluidic channel that is dimensioned so that capillary forces drive the fluid flow into the channel 216. If the dimensions of the channel 216 are sufficiently small, particularly in terms of height and width, capillary forces will be the dominant factor driving the fluid flow. The reservoir 214 may also include a hydrophobic surface to assist in driving fluid flow into the channel 216. For example, the reservoir 214 may include a thin layer of $TiO_2$ coating. The channel 216 may also include a hydrophilic surface to assist in driving fluid flow, such as achieved with oxygen plasma etching of the channel's surface.

The sensor 200 is arranged such that the flow of the fluid 202 causes the state of the sensor 200 to be permanently changed from the activated state to a triggered state. The fluid flow causes a permanent change in a property of the sensor 200 that is irreversible such that the sensor 200 cannot revert to the activated state. As shown in FIG. 1, the reservoir 214 incorporates conductors or plates to form an electrical capacitor 204, whereby the presence of a fluid 202 in the fluidic well 214 will alter the dielectric constant of the capacitor 204, hence determining the capacitance value measured in Farads. Although not shown in this embodiment, the capacitor 204 may be constructed from interdigitated fingers to maximise the plate surface area and capacitance measured.

The fluid flow from the reservoir 214 into the channel 216 causes a permanent change in capacitance. In particular, the fluid flow is driven away from the conductors or plates 206 of the capacitor 204 into the channel 216 and is unable to return to the reservoir 214 to revert the sensor 200 to the activated state. The surface of the capacitor's conductors or plates 206 are therefore permanently changed due to the fluid flow.

In other embodiments, the sensor 200 may be configured to measure other electrical or chemical properties of the fluid 202 than capacitance, which is indicative of the triggered state of the sensor 200. For example, the permanent change in the sensor property may include an electrical property other than capacitance, such as impedance, resistance and inductance. Alternatively, the permanent change in the sensor property may include a chemical property such as density, viscosity and conductivity.

As shown in FIG. 1, the sensor 200 includes an indicator chamber 218 at an end of the channel 216 other than the reservoir end, for example, the end of the channel 216 being opposite from the reservoir 214. When the temperature limit is violated and the fluid 202 melts, the fluid flows from the reservoir 214 into the channel 216 and travels along the channel 216 until it reaches the indicator chamber 218. The indicator chamber 218 includes an absorbent material that absorbs the fluid 202. Once this occurs, the fluid 202 is trapped in the absorbent material, thereby preventing the fluid 202 from re-entering the reservoir 214 via the channel 216. Accordingly, the indicator chamber 218 ensures that the sensor 200 cannot be reset and permanently changes its state from the activated state to the triggered state.

The sensor 200 is also configured to provide a permanent visual indicator of the change in sensor state to the triggered state. The absorbent material of the indicator chamber 218 is impregnated with a colour dye that changes colour when the absorbent material is wetted by the fluid flow. Accordingly, the colour change may be observed by a human operator to provide an immediate visual indication of a temperature limit violation. In this regard, the indicator chamber 218 is preferably transparent, along with the upper layer 230 of the device 100 as shown in FIG. 2.

The sensor 200 is optimised to provide a determined time tolerance for indication of the temperature limit violation. The time tolerance indicates the length of time, such as in seconds or minutes, that the sensor 200 takes to respond to a temperature limit violation and change its state to the triggered state. The time tolerance may be critical depending on the nature of the item. For example, biological samples will typically require a short time tolerance so that a human operator can be quickly alerted to a temperature limit violation. However, the time tolerance may not be so crucial for food products, which may be able to withstand a longer period prior to indication. To achieve a desired time tolerance, the length and shape of the channel 216 is optimised in conjunction with the volume and type of the fluid 202 to ensure that temperature limit violations are indicated in a timely manner for the particular item.

In order for the fluid 202 to flow, the sensor 200 includes a ventilation path 222 for equalising the pressure between the reservoir 214 and the indicator chamber 218. As shown in FIG. 1, the sensor 200 includes a pressure-equalising return path 222 between the reservoir 214 and the indicator chamber 218. The return path 222 may include a hydrophobic surface, such as with a thin layer of TiO2 coating, to avoid fluid entry into the return path 222 from the reservoir 214. Additionally/alternatively, a barrier 224 may also be provided between the return path 222 and reservoir 214 to prevent fluid entry into the return path 222. In other embodiments, the reservoir 214 and indicator chamber 218 may be vented to atmosphere in order to equalise the pressure as shown in FIG. 2.

An alternative embodiment of the device 100 is illustrated in FIG. 2. In contrast to the device 100 of FIG. 1, the capacitor 204 is positioned at an end of the channel 216 other than the reservoir or storage chamber end, for example, the end of the channel 216 that is opposite from the reservoir or storage chamber 214, such that the fluid flow is driven towards the conductors 206 of the capacitor 204. When the fluid 202 melts, the fluid flows from the reservoir 214 into the channel 216 and flows across the conductors 206 of the capacitor 204. The presence of the fluid 202 alters the dielectric constant of the capacitor 204, thus causing a permanent change in capacitance. The surface of the capacitor 204 is permanently changed due to the fluid flow. If the surrounding temperature falls below the fluid's melting point, the fluid 202 will change phase from a liquid to a solid. Otherwise, it will remain in liquid phase across the capacitor plates 206.

The sensor 200 of FIG. 2 also includes a ventilation path 222 between the reservoir or storage chamber 214 and the capacitor 204. The ventilation path 222 is such that the reservoir 214 and capacitor 204 are vented to atmosphere in order to equalise the pressure in the sensor 200 and allow the fluid 202 to flow therethrough. Although not shown, the sensor 200 may also include an indicator chamber 218 as described above and the capacitor 204 may be incorporated into the indicator chamber 218. Due to absorption of the fluid 202 by the absorption material of the indicator chamber 216, the fluid 202 will be prevented from returning to the reservoir 214 and reverting the sensor 200 to its activated state.

Figure 3:
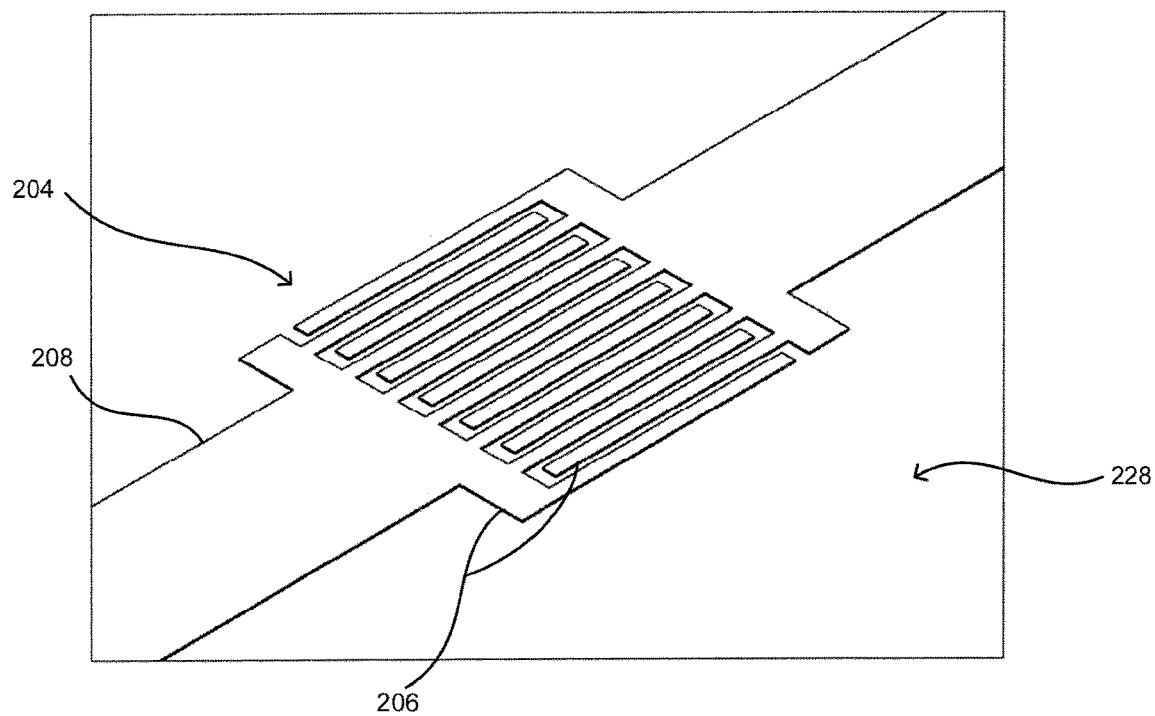
FIGS. 3 and 4 are enlarged views of a capacitor and inductor forming part of the device depicted in FIG. 2.
Figure 4:
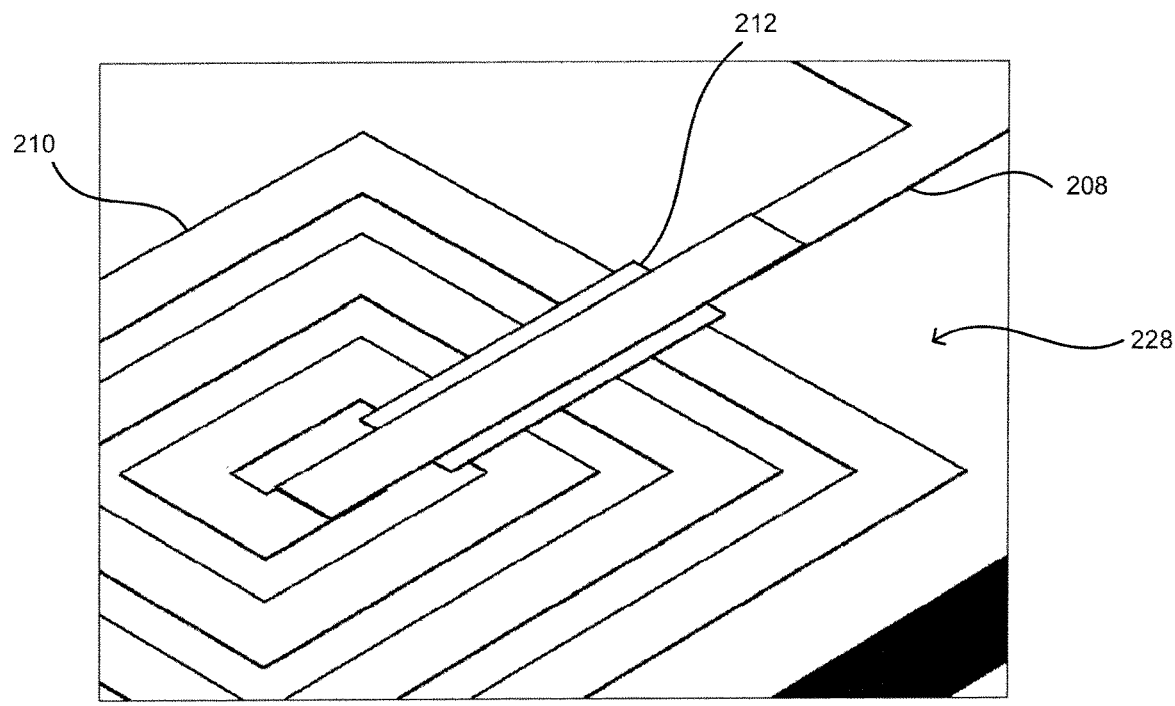

FIGS. 3 and 4 show enlarged views of the capacitor 204 and an inductor 210 of the embodiment of FIG. 2. In this embodiment, the capacitor 204 is an interdigitated capacitor having two electrodes 206 having fingers and a gap therebetween. The number of fingers and the gap between the fingers determines the capacitance value. The interdigitated fingers advantageously maximise the plate surface area and capacitance measured. The capacitance is tuned to a certain range depending on the fluid type and frequency range of an interrogator 400 (see FIG. 5). The capacitor 204 may be made of metals such as gold, platinum and aluminium. Similarly, the sensor 100 includes an inductor 210 that may be made of the same materials as the capacitor 204. The number of turns and distance between the turns of the inductor 210 are selected in order to determine its inductance range. An insulating layer 212 of oxide such as silicon dioxide or aluminium oxide is included in the inductor 210 to isolate the contact pads as shown in FIG. 4.

As shown in FIGS. 1 to 4, the sensor 200 includes an electrical circuit 208 connected to the capacitor 204. The electrical circuit 208 includes an inductor 210 along with the capacitor 204 to form an electrical tuned resonant circuit. The inductor 210 as shown in FIGS. 1, 2 and 4 is a wire wound element, and may also include discrete elements as would be conceivable to a skilled addressee for use in the context of the present invention. The inductor 210 provides a fixed value of inductance measured in Henrys. As mentioned above, the capacitance will vary due to the fluid flow from the reservoir 214 into the channel 216 when the temperature limit is violated. The resonant frequency measured in Hertz of the circuit 208 is governed by the equation:

$$f_0 = \frac{1}{2\pi\sqrt{LC}}$$

where:
$f_0$ is the resonant frequency in Hertz;
L is the inductance in Henrys; and
C is the capacitance in Farads.

The resonant frequency will vary due to the change in capacitance caused by the fluid flow from the reservoir 214 into the channel 216. Thus, a variation in resonant frequency of the electrical circuit 208 will provide a permanent indication of a temperature limit violation of the item. The resonant frequency and amount of change in frequency due to the temperature limit violation may be adjusted by varying the capacitor 204 and inductor 210 dimensions and/or by adding other components to the electrical circuit 208, such as discrete capacitors and inductors as would be conceivable to a skilled addressee. The variation in resonant frequency is machine-readable in order to provide a permanent indication of the temperature limit violation. The resonant circuit 208 may be interrogated by direct electrical contact through exposed terminals on a housing of the device 100 (not shown). Preferably, the resonant circuit 208 is interrogated passively and wirelessly by inductive coupling between an interrogator coil 402 and the sensor's inductor coil 210 as described below.

The variation in resonant frequency may be analysed to not only provide an indication that a temperature limit violation has occurred, but also to indicate the amount of fluid 202 in the sensor 200 that converted to liquid phase and the amount of time that the temperature limit of the item was violated. This may be beneficial where a short temperature excursion has occurred such that only a small amount of the fluid 202 has thawed prior to refreezing. Accordingly, the viability of the item may be assessed depending on the extent of the temperature limit violation.

An example of a suitable electrical circuit 208 may be derived as follows. A printed spiral inductor 210 of 20 turns in a 5 mm diameter produces approximately 5 µH. An interdigitated capacitor 204 formed with 500 fingers within a dimension of 5 mm by 5 mm produces capacitance of approximately 66 pF with no fluid 202 present (dielectric constant $\epsilon=1$). Assuming that 100% ethanol is used as the fluid 202, the value of capacitance with ethanol on top of the capacitor 204 is approximately 387 pF (dielectric constant $\epsilon\approx30$). The value of capacitance with water on top of the capacitor 204 is approximately 940 pF (dielectric constant $\epsilon\approx80$). Each of these scenarios will then produce the following resonant frequencies: approximately 8.8 MHz without fluid 202, approximately 3.6 MHz with ethanol only and approximately 2.3 MHz with water only. By varying the mixture of water and ethanol concentration, the capacitance value and hence resonant frequency will vary between these limits.

Figure 5:
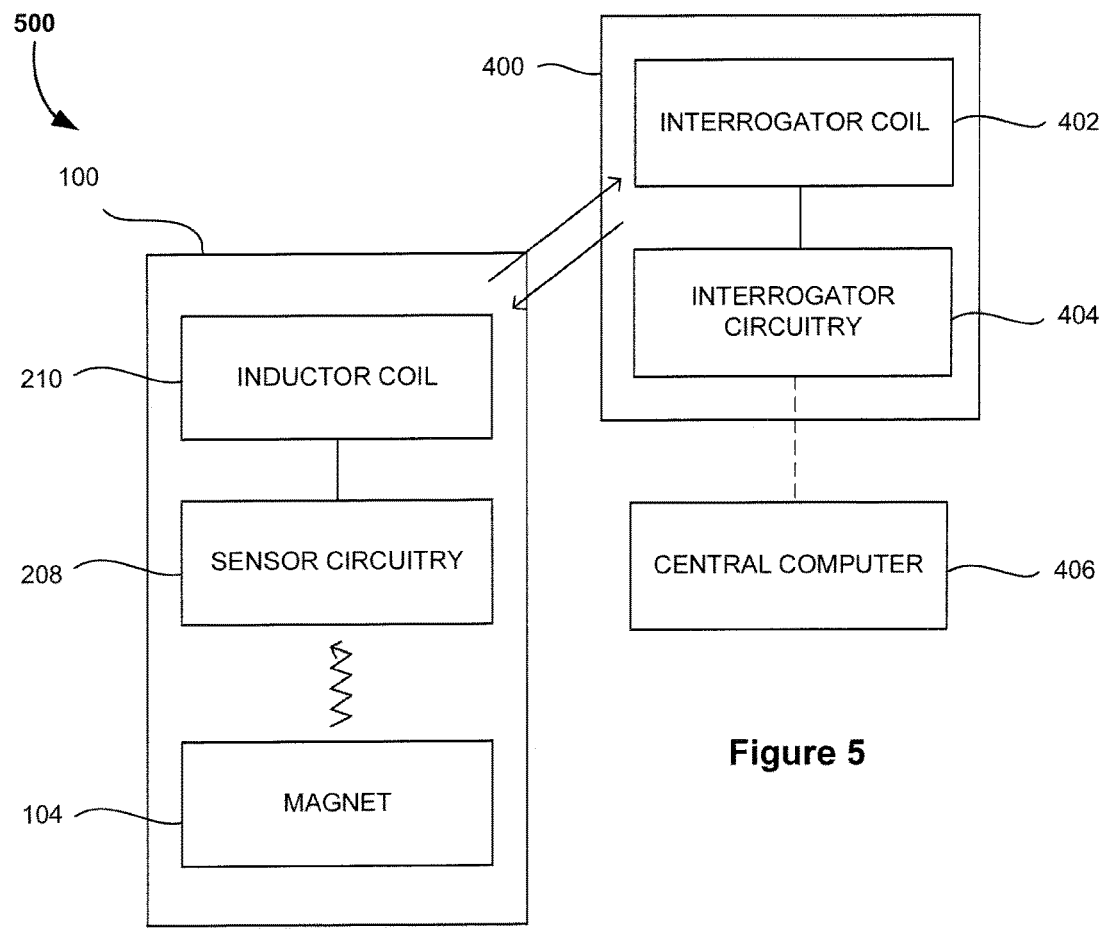
FIG. 5 is a detailed schematic diagram of a system for detecting violation of a temperature limit of an item, illustrating the elements and circuitry of the device of FIGS. 1 to 4 and an interrogator.

As shown in FIG. 5, the device 100 may form part of a system 500, along with an interrogator 400, according to a preferred embodiment of the invention. The device 100 may be positioned near the item and the interrogator 400 may be configured to identify the change in sensor state when the temperature limit is violated, and detect violation of the temperature limit based on the identified change in sensor state.

The interrogator 400 may be used for reading data borne by the sensor circuitry 208 via the inductor coil 210. The interrogator 400 may be in the form of a wand that is positionable near the inductor coil 210 of the device 100. Advantageously, the interrogator 400 may read data through the inductor coil 210 without removing the device 100 from its temperature-controlled storage environment. As shown in FIG. 5, the interrogator 400 notably includes an interrogator coil 402 and associated interrogator circuitry 404. The interrogator circuitry 404 is adapted to generate an excitation signal in the interrogator coil 402. The excitation signal is transferred by induction to the inductor coil 210 of the sensor 200. The sensor 200 having the machine-readable indicator draws power from the excitation signal induced in the inductor coil 210, energizing the electrical circuit 208 in the sensor 200. The sensor 200 then transmits the data encoded, i.e. the variation in resonant frequency, in the sensory circuitry 208 via the inductor coil 210. This data is then captured by the interrogator coil 402 and read by the interrogator circuitry 404. In some embodiments, the data may be transferred from the interrogator circuitry 404 to a central computer 406 for storage.

The sensor 200 is further configured to provide a machine-readable identifier of the item so as to provide unique item identification. In order to provide the machine-readable identifier, the sensor 200 may include a plurality of resonant members encoding an identification code and the resonant members may have different resonant frequencies from each other. The identification code may include information for item identification such as the item number, type, preparation date and expiry date, and information for location identification. Advantageously, the item may be identified without the need to remove it from the temperature-controlled storage environment, thereby reducing the likelihood of compromising viability of the item.

Figure 6:
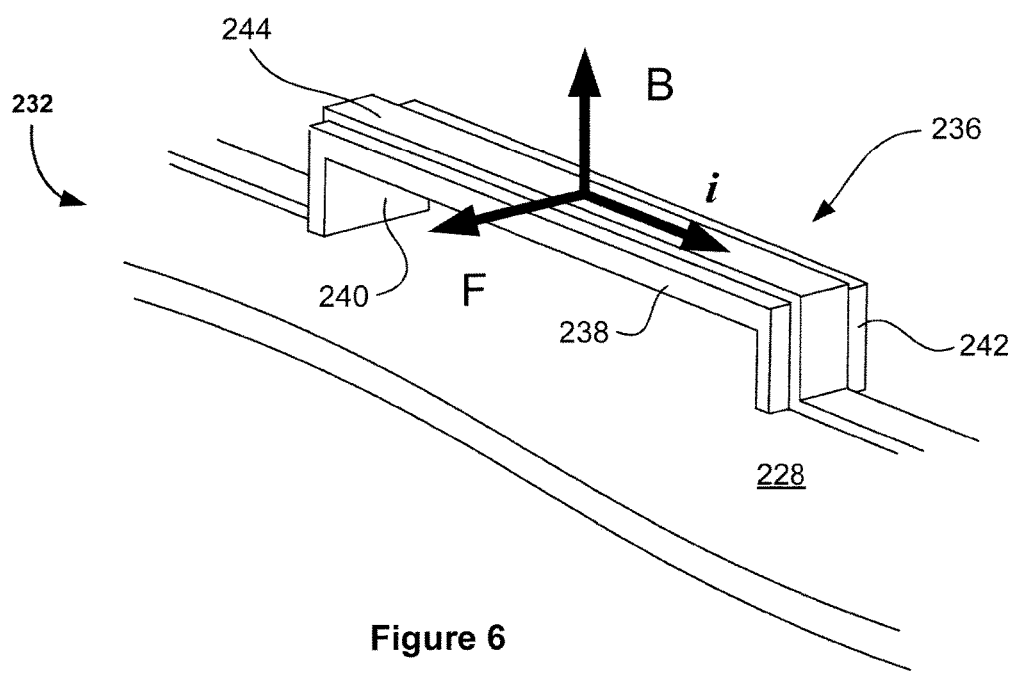
FIG. 6 is an isometric view of an embodiment of a resonant member forming part of the device of FIG. 1.

In a preferred embodiment of the invention, the sensor 200 includes a plurality of micro-mechanical vibratable or resonant members 232 each having a particular resonant frequency, as shown in FIG. 6. A common electrical conductor 244 runs along the vibratable members 232. The electrical conductor 244 is a section of the electrical circuit 208 of the sensor 200 as shown in FIG. 1 including three u-shaped sections corresponding to the resonant members 232. Although not shown and described herein, the device 100 of FIG. 2 may similarly include a plurality of resonant members 232. The vibratable members 232 are formed on the supporting layer or substrate 228 of the sensor 200 as shown in FIG. 6. The vibratable members 232 are caused to vibrate by an applied excitation or interrogation signal generated by the interrogator 400 that induces an alternating current in the electrical conductor 244 by means of Faraday induction via the inductor coil 210.

The vibratable members 232 may be vibratable by a Lorentz force. The Lorentz force is the force that acts on a charged particle travelling through an orthogonal magnetic field. In this instance, a magnetic field is applied to the vibratable members 232 in a direction perpendicular to the current flow through the electrical conductor 244. In some embodiments, the device 100 may further include a magnet 104 or element by which a magnetic field is applied orthogonally to the sensor 200. For example, a magnet 104 may be positioned adjacent and beneath the sensor 200 in the device 100. Alternatively, the magnet 104 may be included in the item or a container storing the item (not shown).

FIG. 6 depicts a vibratable member 232 in the form of a bridge structure 236 including a beam 238 supported by two columns 240 and 242 projecting from a substrate 228. The structure shown in FIG. 6 may be formed by conventional semiconductor fabrication techniques involving the use of known etching and deposition processes. Once the bridge structure 236 has been formed on the substrate 228, an electrically conductive path 244 is then deposited along the length of the structure 236. The electrically conductive path 244 forms part of the electrical circuit 208 as shown in FIG. 1. The vibratable members 232 are described in more detail in International Patent Application No. WO 2004/084131, to the present Applicant, the entire contents of which are incorporated herein by reference.

When an interrogation signal is applied to the sensor 200, alternating electrical current is induced in the inductor coil 210 which thus causes the flow of electrical current through the conductive path 244. In the presence of an orthogonal magnetic field, a force is then applied to the beam 238 in a direction that is orthogonal to both the direction of the current flow and the magnetic field direction. Since the current in the conductor 244 is an alternating current, the orthogonal force generated is also an alternating force, resulting in the vibration of the beam 238. If the frequency of the alternating current in the conductor 244 is at or near the resonant frequency of the beam 238, the beam 238 will vibrate.

Figure 7:
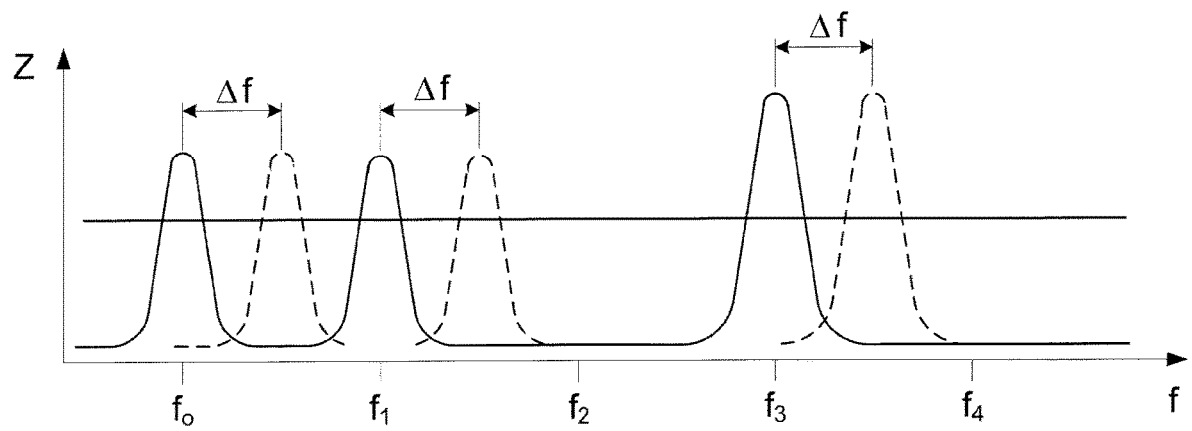
FIG. 7 is a graphical representation of the frequency response of the electrical circuit shown in FIG. 1.

Referring now to FIG. 7, each of the resonant members 232 forming part of the sensor 200 have a notional resonant frequency corresponding to one of a predetermined number of resonant frequencies $f_1$, $f_2$, $f_3$, etc. Preferably, the resonant frequencies $f_1$, $f_2$, $f_3$, etc. are in a different frequency range. If the interrogator 400 detects a resonant frequency at any of the frequency positions $f_1$ onwards, the interrogator circuitry 404 interprets that resonant frequency as a binary "1". By contrast, the absence of a resonant frequency at any of those predetermined frequency positions is interpreted as a binary "0". The sequence of binary 1's and 0's detected by the interrogator circuitry 404 corresponds to a machine-readable identifier.

The variation in resonant frequency due to the temperature limit violation (i.e. the machine-readable indicator) may be detected by the interrogator 400 in a similar manner. Preferably, the resonant frequency due to the temperature limit violation is in a different frequency range to the resonant members 232 of the sensor 200. If the interrogator 400 detects a resonant frequency at e.g. frequency positions $f_3$ onwards, the interrogator circuitry 404 interprets that resonant frequency as a binary "1", otherwise the absence of a resonant frequency may be interpreted as a binary "0". Further, the interrogator circuitry 404 may discriminate between the sequence corresponding to the machine-readable identifier and the machine-readable indicator through the impedance value. As shown in FIG. 7, the impedance value may be larger for the machine-readable indicator than the machine-readable identifier. Thus, the machine-readable indicator and machine-readable identifier may advantageously be read in a single interrogation of the electrical circuit 108 by the interrogator 400. The interrogator 400 and resonant members 232 are described in greater detail in International Patent Application No. WO 2010/037166, to the present Applicant, the entire contents of which are incorporated herein by reference.

In other embodiments, the machine-readable identifier may not be incorporated into the substrate 228 of the sensor 200. The device 100 may be configured to store a machine-readable tag having the machine-readable identifier. Alternatively, the device 100 may be sized to mount with a machine-readable tag for providing the two functions of identification and indication of temperature limit violations of an item. Preferably, the machine-readable tag and sensor 200 are in close proximity for allowing reading of the machine-readable indicator and machine-readable identifier in a single interrogation.

The machine-readable tag having the machine-readable identifier may be replaced with an active or passive RFID tag which does not necessarily include a MEMS structure, such as a CMOS based RFID tag. For example, a resistor having a temperature-dependant value could form part of the tag and that value be read. Alternatively, an antenna forming part of the tag may have a temperature-dependant impedance which is detectable by a tune antenna. A skilled addressee will be able to conceive of a variety of machine-readable tags which are suitable for use in the context of the present invention.

In some embodiments, the device 100 includes two or more sensors 200 and each sensor 200 stores a different fluid for indicating violation of more than one temperature limit of the item. Advantageously, this allows visual and/or machine-readable feedback of temperature limit violations to be provided during different stages of thawing of the item. The temperature limit of the item may be a single temperature threshold or a range of temperatures. The item may be temperature-sensitive and selected from one of a group including: biological samples; fresh produce, food products, perishables, pharmaceuticals and chemical compounds. Each of these items may require storage at temperatures of −200° C. to 0° C. Accordingly, the temperature limit may be either a temperature value or temperature range that is within a range of from −200° C. to 0° C.

In some embodiments, the device 100 is fabricated using MEMS (micro-electromechanical systems) technology, which is also known as PST (Micro System Technology) and micromachining. Preferably, the micro-mechanical vibratable or resonant members 232 as described herein are fabricated using MEMS technology. MEMS technology includes fabrication technologies for integrated circuits, and technologies specifically developed for micromachining. It generally relates to the fabrication of components with dimension in the range of micrometres to millimetres.

MEMS techniques may include for example masking, deposition and etching steps, amongst other well-known lithographic and micromachining processes. It may include for example photolithography and thin film deposition or growth. Typically, the process results in a laminate structure. A number of structural layers can be formed on a substrate, and required components can be formed by selective etching of the substrate and/or sacrificial materials and component materials deposited therein. The resulting micromachined components may be combined with electronics that are fabricated using standard integrated circuit processes.

The sensor 200 shown in FIGS. 1 to 4 may be fabricated using standard photolithography methods although the process for forming the sensor 200 of FIGS. 2 to 4 will now be described. Initially, the substrate or supporting layer 228 is coated with a photoresist, the thickness of which is determined by its type and rotational speed. The photoresist may be SU8 or a polymer such as polydimethylsiloxane (PDMS). The substrate is then exposed under an ultraviolet light source with optimal power density. The layout of the sensor is applied by a mask developed with computer-aided software, which is usually made of chromium and includes desired patterns. For a positive resist, the area that is exposed will be removed in a subsequent step. An electron beam evaporator is then used to deposit a layer of metals, such as gold, which is evaporated and lifted-off. The capacitor 204 and part of the inductor 210 may be deposited in a single step.

The next step is to create an insulating layer 212 for isolating the contact pads of the inductor 210. For this purpose, another photolithography process is performed repeating the steps described above but with a different pattern and change of metal to an oxide, such as silicon dioxide or aluminium oxide. A further photolithography process is required to connect the centre of the inductor coil 210 with the inductor pad 212. Another photolithography process is required to create the channel 216. The height and width of the channel 216 are controllable when coating the substrate 228 with the photoresist based on the resist type and rotational speed. Finally, an upper layer or cover 230 is assembled to the substrate 228 to form the reservoir 214 and ventilation path 222. The upper layer 230 may be made of acrylic or polyvinyl chloride (PVC) and adhered to the substrate 228.

Returning to the system 500 of FIG. 5, the interrogator 400 may be configured to detect a machine-readable indicator of the change in sensor state. As shown in FIG. 5, the interrogator 400 includes an interrogator coil 402. The interrogator coil 402 is configured to interrogate an electrical circuit 208 of the sensor 200 (see FIGS. 1 to 4). The interrogator coil 402 may be positioned such that it is in proximity to the electrical circuit 208 of the sensor 200 in use. Whilst the interrogator 400 need not be in direct contact with the device 100, it should be positioned in close proximity in order to detect the machine-readable indicator. Preferably, the device 100 is able to be interrogated without requiring removal of the device 100 directly from or near from the item. This advantageously ensures viability of the item since it can remain in a temperature-controlled environment during the interrogation.

FIG. 5 illustrates that the interrogator 400 includes an integrated signal processing circuitry 404 which is able to generate an interrogation signal in the interrogator coil 402. When the interrogator coil 402 is in proximity with the inductor coil 210 of the sensor 200, an excitation signal is induced in the inductor coil 210 from the interrogation signal in the interrogator coil 402. The machine-readable indicator is detected by the interrogator 400 as a variation in resonant frequency of the electrical circuit 208.

In some embodiments, the interrogator 400 is further configured to detect a machine-readable identifier of the item. The machine-readable identifier may include a unique identification code for the item as described herein. The identification code may also include information such as the time, date, location of the item and the operator or user. In this regard, the sensor 200 may include at least one resonant member 232 as shown in FIGS. 1 and 6. The machine-readable identifier may be detected by the interrogator 400 as a variation in resonant frequency of the electrical circuit 208.

As shown in FIG. 1, the at least one resonant member 232 may be included on the substrate 228 of the sensor 200 and the common electrical conductor 244 may be part of the electrical circuit 208. Accordingly, the machine-readable identifier and the machine-readable indicator may be detected in a single interrogation of the electrical circuit 208 by the interrogator. The machine-readable identifier and the machine-readable indicator may be distinguished based on the extent of variation of resonant frequency and/or impedance as described above and with reference to FIG. 7.

In some embodiments, the interrogator 400 emits an alert if a temperature limit violation is detected. This serves to alert an operator if the item's temperature exceeds a critical temperature above or below which the item may become unviable or degrade. This alert could be of an auditory, visual or sensory nature, e.g. illumination of an LED, a flashing LED, or a change in colour of an LED, an audible alert such as a tone, or a vibration.

The system 500 may also include one or more temperature sensors and may be selected from one or more of an optical sensing means including laser and/or infra-red or wired sensing means including thermocouple, thermistor and/or resistance temperature detectors (RTD). It is to be understood that the foregoing examples are not exhaustive and that other suitable means could be envisaged. Each temperature sensor may be associated with a single item or more than one item. Where a number of temperature sensors are provided, any variation in temperature across the items can be determined. The temperature sensors may advantageously provide instantaneous temperature measurements, in addition to the temperature limit violations indicated and/or detected by the sensor 200.

In some embodiments, the interrogator 400 further includes a communication module for transmitting one or more of: detecting temperature limit violations, identification of the item and temperature of the item. The temperature and identification data is recorded and can be downloaded or otherwise electronically transmitted to a remote computer or server either live or at some subsequent time. Accordingly, a permanent data log of the item can be maintained throughout various storage, processing and transport activities that the item may be subject to over its life. In some embodiments, the recordings may be made continuously and the data transmitted to a remote computer or server periodically or streamed continuously as required.

The temperature limit may be either a temperature value or temperature range within a range of from −200° C. to 0° C. The item may be temperature-sensitive and selected from one of a group including: biological samples; fresh produce, food products, perishables, pharmaceuticals and chemical compounds.

Figure 8:
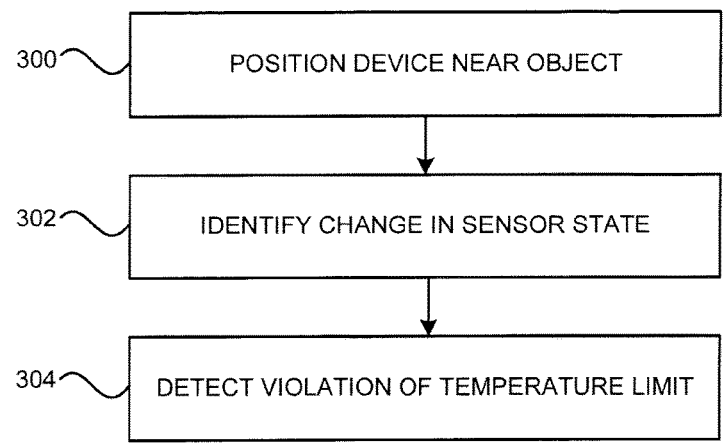
FIG. 8 is a flow chart illustrating the steps in a method for detecting violation of a temperature limit of an item according to an embodiment of the invention.

Referring now to FIG. 8, a flow chart is illustrated showing steps in a method for detecting violation of a temperature limit of an item according to a preferred embodiment of the invention. The method includes at step 300 positioning the inventive device 100 as described herein near the item. The method also includes at step 302 identifying the change in sensor state when the temperature limit is violated. Further, the method includes at step 304 detecting violation of the temperature limit based on the identified change in sensor state.

Preferably, the inventive device 100 is positioned near the item for providing close thermal contact, and may be sized and/or shaped for positioning directly at or substantially near the item. The method may include positioning the device 100 within the item, such as a biological sample, or incorporating it into a storage container, such as a vial, bag or similar vessel. The method may also include directly attaching the device 100 to the item or a container storing the item.

Figure 9:
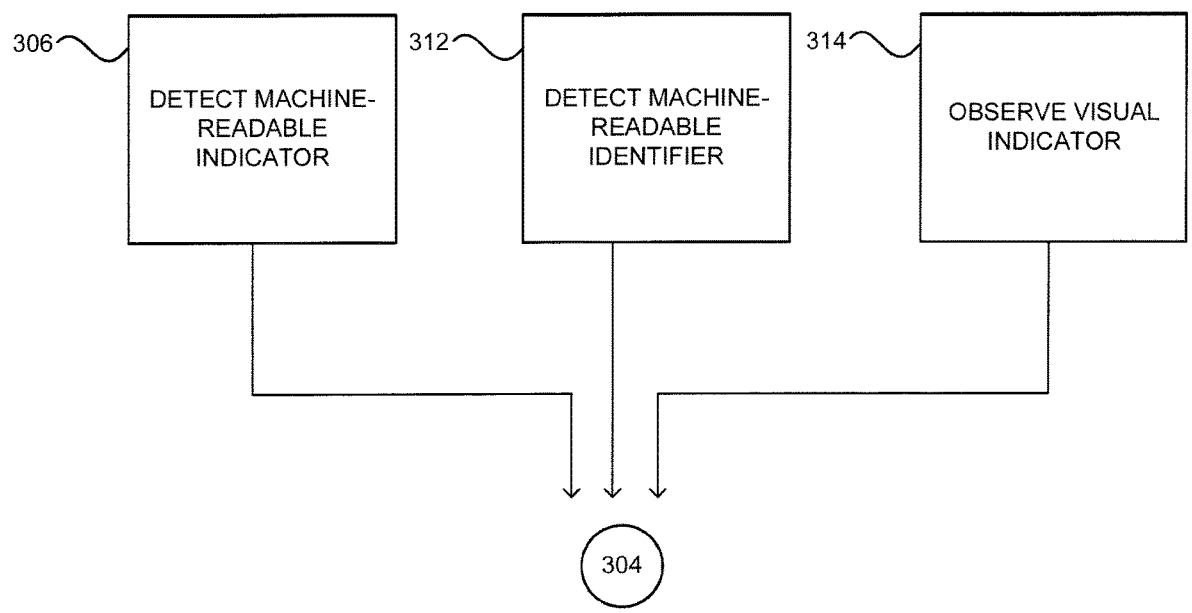
FIG. 9 is a flow chart illustrating further steps in the method of FIG. 8 relating to identifying the sensor state.
Figure 10:
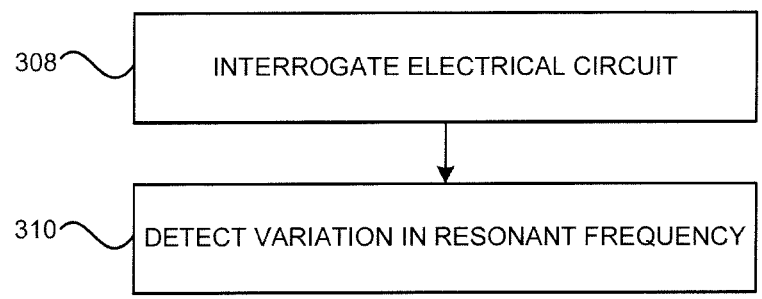
FIG. 10 is a flow chart illustrating further steps in the method of FIG. 9 relating to detecting the machine-readable indicator and machine-readable identifier.

FIG. 9 illustrates a flow chart showing further steps in the method shown in FIG. 8. In some embodiments, identifying the change in sensor state includes at step 306 detecting a machine-readable indicator of the change in sensor state. As shown in FIG. 10, detecting the machine-readable indicator may include interrogating an electrical circuit 208 of the sensor 200 at step 308 and then detecting a variation in resonant frequency of the electrical circuit 208 at step 310. The method may include directly contacting the electrical circuit 208 of the sensor 200 to measure the variation in resonant frequency.

Alternatively, the method may include positioning an interrogator 400 in the form of a wand near the sensor 200 for passive and wireless interrogation. As shown in FIG. 5, the method may include generating an excitation signal in an interrogator coil 402 of the interrogator 400 and transferring the excitation signal by induction to an inductor coil 210 of the sensor 200. Further, the method may include transmitting the data encoding the machine-readable indicator in the sensor circuitry 208 via the inductor coil 210 to the interrogator coil 402. The variation in resonant frequency may be detected by the interrogator circuitry 404 reading the data captured by the interrogator coil 402. The method may also include transferring the data from the interrogator circuitry 404 to a central computer 406 for storage.

FIG. 9 illustrates that identifying the change in sensor state may also include at step 312 detecting a machine-readable identifier of the sensor 200. As shown in FIG. 10, detecting the machine-readable identifier includes interrogating an electrical circuit 208 of the sensor 200 at step 308 and then detecting a variation in resonant frequency of the electrical circuit 208 at step 310. The machine-readable identifier can be detected in a similar way to the machine-readable indicator using the interrogator 400 as described above. Further, the method may include detecting the machine-readable indicator and machine-readable identifier in a single interrogation of the electrical circuit 208 such as by using interrogator 400. The method may also include differentiating between the detected resonant frequencies of the machine-readable indicator and machine-readable identifier based on the frequency value and/or impedance value.

Figure 11:
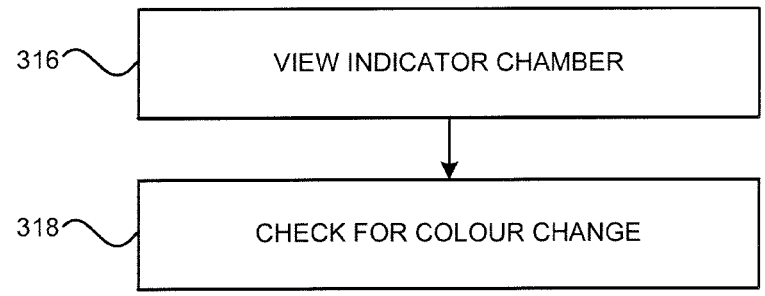
FIG. 11 is a flow chart illustrating further steps in the method of FIG. 9 relating to observing the visual indicator.

The step 302 of identifying the change in sensor state also includes at step 314 observing a permanent visual indicator of the change in sensor state as illustrated in FIG. 9. As shown in FIG. 11, observing the visual indicator includes at step 316 viewing an indicator chamber 218 of the sensor 200 having a colour dye and at step 318 checking for a colour change in the dye of the indicator chamber 218. Advantageously, viewing of the visual indicator provides for immediate detection by an operator of a temperature limit violation.

Figure 12:
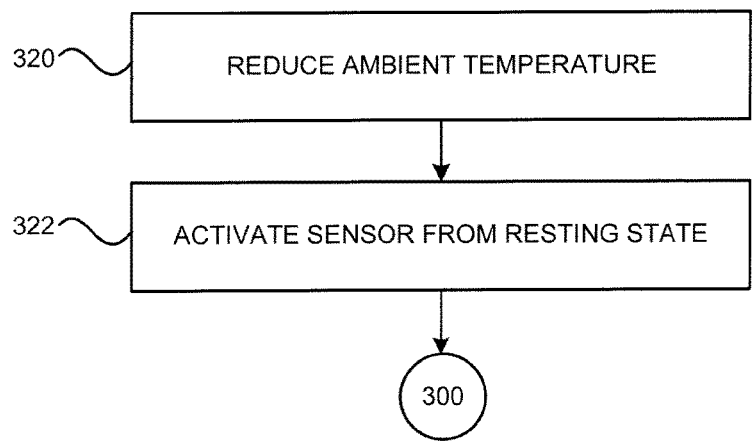
FIGS. 12 and 13 are flow charts illustrating further steps in the method of FIG. 8 relating to activating the sensor from a resting state.
Figure 13:
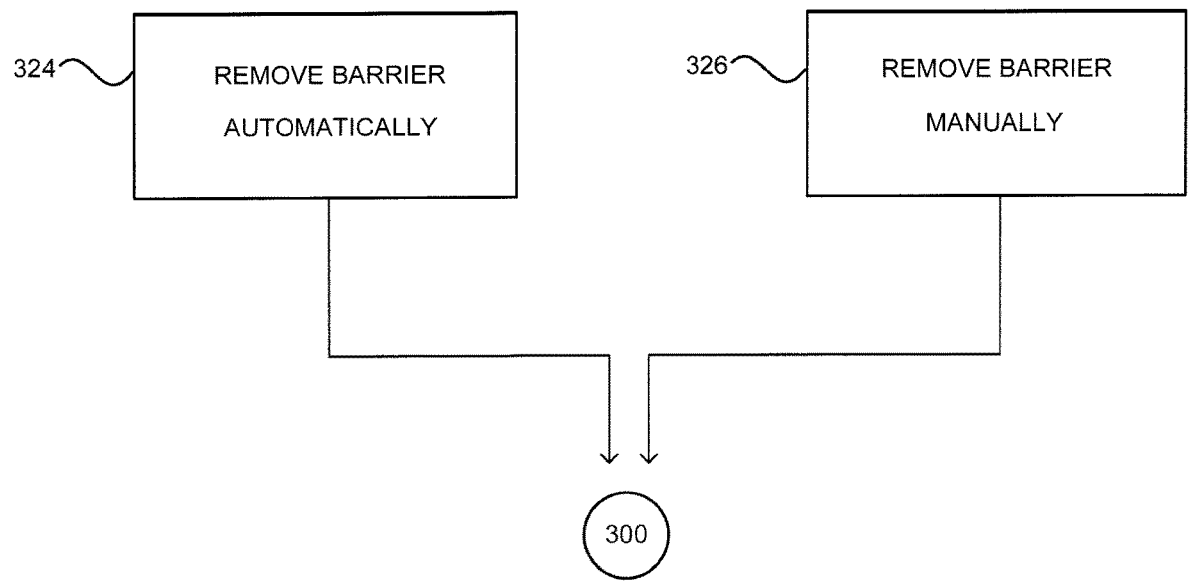

FIGS. 12 and 13 illustrate flow charts showing further steps in the method shown in FIG. 8 relating to activating the sensor 200. Before the step 300 of positioning the device 100 near the item, the method includes at step 320 reducing the ambient temperature such that a fluid 202 stored in a reservoir 214 of the sensor 200 changes phase from a liquid to a solid. After step 320, the sensor 200 is in a resting state. Following this, the method may include at step 322 activating the sensor 200 from the resting state to allow the fluid 202 stored in the reservoir 214 to flow into a channel 216 of the sensor 200.

The step 322 of activating the sensor 200 may include the step of removing a barrier 224 preventing the fluid flow from permanently changing the sensor state. The barrier 224 may include one of a seal, a membrane or a valve as described herein. As shown in FIG. 13, the step of removing the barrier 224 may include one or both of at step 324 automatically removing the barrier 224 or at step 326 manually removing the barrier 224. The step 324 of automatically removing the barrier 224 may include automatically changing the ambient temperature to a desired temperature such that at least one of: a temperature-dependent material of the barrier 224 degrades or shrinks; and a gas-filled capsule of the sensor 200 contracts to remove a force on the barrier 224. The step 326 of manually removing the barrier 224 may include applying and/or removing the presence of a magnetic field influencing a magnetic material of the barrier 224 to alter a magnetic force on the barrier 224; and applying and/or removing a force applied to the barrier 224 by an external actuator coupled to the barrier 224. Preferably, the presence of a magnetic field and the force applied by the external actuator is removed so as to remove forces on the barrier 224.

In some embodiments, the method includes detecting more than one temperature limit violation of an item. The device 100 may include two or more sensors 200 with each sensor 200 storing a different fluid 202 for indicating violation of more than one temperature limit of the item. Beneficially, this allows visual and/or machine-readable detection of temperature limit violations to be provided during different stages of thawing of the item. The fluid 202 may be a single fluid or combination of fluids selected to have a desired melting point corresponding to the temperature limit of the item. Furthermore, the temperature limit may be either a temperature value or temperature range within a range of from −200° C. to 0° C. The item may be temperature-sensitive and selected from one of a group including: biological samples; fresh produce, food products, perishables, pharmaceuticals and chemical compounds.

Advantageously, the inventive device, system and method provide for permanent indication and detection of temperature limit violations that occur during storage, processing and transportation of temperature-sensitive items, particularly items that require cold, ultra-cold (i.e. less than −60° C.) or cryogenic storage. The device, system and method ensure that a permanent record of temperature limit violations is made due to the permanent change in sensor state, which is machine-readable for processing at a later time. Thus, the device, system and method more accurately and reliability indicate and detect temperature limit violations since they do not rely on human operators to observe indicators or process data records.

The device, system and method also provide for visual feedback for immediate detection of temperature limit violations to permit quick intervention by human operators. Further, the device, system and method enable machine-readable identification of the item, which may beneficially occur during the same machine interrogation of the device. Since passive and wireless detection of temperature limit violations can be achieved, the device does not require any power or energy source and further is not adversely affected by sterilising gamma radiation. The device is also advantageously sized and shaped so it can readily provide close thermal contact for accurate indication and detection of temperature limit violations.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

It is to be understood that various modifications, additions and/or alternatives may be made to the parts previously described without departing from the ambit of the present invention as defined in the claims appended hereto.

It is to be understood that the following claims are provided by way of example only, and are not intended to limit the scope of what may be claimed in any future application. Features may be added to or omitted from the claims at a later date so as to further define or re-define the invention or inventions.

The invention claimed is:

1. A device for indicating violation of a temperature limit of an item stored in a temperature-controlled environment, wherein the device is positionable near the item and includes a microfluidic sensor configured to change its state permanently when the temperature limit is violated, wherein the change in sensor state is machine-readable to provide a permanent indication of the temperature limit violation, the microfluidic sensor including:

a reservoir for storing a fluid that changes phase from a solid to a liquid when the temperature limit is violated, wherein the reservoir initially stores the fluid in a liquid state and upon placement of the device in the temperature-controlled environment, the fluid changes phase from a liquid to a solid and the microfluidic sensor adopts a resting state;

a microfluidic channel in fluid communication with the reservoir for receiving flow of the fluid in liquid phase from the reservoir when the temperature limit is violated, the microfluidic channel being sized and shaped such that capillary forces drive the fluid flow from the reservoir into the microfluidic channel; and wherein the sensor is arranged to allow flow of the fluid in the liquid phase such that the state of the sensor is permanently changed, and wherein the sensor is further configured to a barrier positioned between the reservoir and the microfluidic channel for preventing the fluid flow from permanently changing the sensor state until activation of the microfluidic sensor from the resting state, wherein the barrier is removable to activate the microfluidic sensor from the resting state to an activated state in which the microfluidic channel receives the fluid flow from the reservoir when the temperature limit is violated, wherein the flow of the fluid into the microfluidic channel causes a permanent change in an electrical property of the microfluidic sensor such that the state of the microfluidic sensor is permanently changed from the activated state to a triggered state, and wherein the microfluidic sensor further includes an electrical circuit configured to provide a machine-readable indicator of the permanent change in sensor state to the triggered state.

2. The device according to claim 1 wherein the barrier is positioned within the microfluidic channel or at an end of the microfluidic channel other than the reservoir end.

3. The device according to claim 1 wherein the barrier is removable to activate the microfluidic sensor by at least one of:

the barrier including a temperature-dependent material that degrades or shrinks at a desired temperature;

the microfluidic sensor further including a gas-filled capsule that contracts to remove a force on the barrier at a desired temperature; the barrier including a magnetic material to which a magnetic field can be applied and/or removed to alter a magnetic force on the barrier; and the barrier being coupled to an external actuator that is operable to apply and/or remove a force on the barrier.

4. The device according to preceding claim 1 wherein the reservoir includes a hydrophobic surface to encourage fluid flow from the reservoir into the microfluidic channel.

5. The device according to claim 1 wherein the microfluidic channel includes a hydrophilic surface to encourage fluid flow from the reservoir into the microfluidic channel.

6. The device according to claim 1 wherein the microfluidic sensor is further configured to provide a permanent visual indicator of the change in sensor state and the microfluidic sensor includes an indicator chamber in fluid communication with the microfluidic channel, the indicator chamber including an absorbent material impregnated with a colour dye that changes colour when the absorbent material is wetted by the fluid flow, wherein the indicator chamber is positioned at an end of the microfluidic channel other than the reservoir end to prevent the absorbed fluid from returning to the reservoir and ensure that the state of the microfluidic sensor is permanently changed.

7. The device according to claim 1 including two or more microfluidic sensors, each microfluidic sensor storing a different fluid for indicating violation of more than one temperature limit of the item.

8. The device according to claim 1 wherein the microfluidic sensor includes a ventilation path for equalising the pressure to allow fluid flow therethrough.

9. The device according to claim 8 wherein the ventilation path is in fluid communication with at least the reservoir, and the barrier is positioned at least one of: between the reservoir and the ventilation path; at an end of the ventilation path other than the reservoir end; or within the ventilation path.

10. The device according to claim 1 wherein the electrical property is selected from one of a group including: impedance, resistance, capacitance and inductance.

11. The device according to claim 10 wherein the microfluidic sensor includes a capacitor and the fluid flow is either driven towards or away from conductors of the capacitor to cause a permanent change in capacitance.

12. The device according to claim 11 wherein the sensor includes an electrical circuit is connected to the capacitor and configured to provide the machine-readable indicator of the change in sensor state.

13. A system for detecting violation of a temperature limit of an item stored in a temperature-controlled environment, the system including:
   a device according to claim 1 positioned near the item; and
   an interrogator configured to:
      identify the change in sensor state when the temperature limit is violated; and
      detect violation of the temperature limit based on the identified change in sensor state.

14. The system according to claim 13 further including:
   one or more temperature sensors positionable in thermal proximity to the item.

15. The system according to claim 13 wherein the one or more temperature sensors are selected from one or both of: optical temperature sensors including laser and/or infra-red, or wire temperature sensors including thermocouple, thermistor and/or resistance temperature detectors (RTD).

16. The system according to claim 13 wherein the interrogator further includes an alert component which emits an alert if a temperature limit violation is detected.

17. The system according to claim 13 wherein the interrogator further includes a communications module for transmitting one or more of: detected temperature limit violations, identification of the item and temperature of the item to a remote computing system to provide a data log accessible over a communications network.

* * * * *